(12) United States Patent
Bevirt

(10) Patent No.: US 9,930,298 B2
(45) Date of Patent: Mar. 27, 2018

(54) TRACKING OF DYNAMIC OBJECT OF INTEREST AND ACTIVE STABILIZATION OF AN AUTONOMOUS AIRBORNE PLATFORM MOUNTED CAMERA

(76) Inventor: JoeBen Bevirt, Santa Cruz, CA (US)

(*) Notice: Subject to any disclaimer, the term of this patent is extended or adjusted under 35 U.S.C. 154(b) by 541 days.

(21) Appl. No.: 13/451,509

(22) Filed: Apr. 19, 2012

(65) Prior Publication Data
US 2012/0287274 A1    Nov. 15, 2012

Related U.S. Application Data

(60) Provisional application No. 61/476,767, filed on Apr. 19, 2011.

(51) Int. Cl.
*H04N 7/18* (2006.01)
*G01S 19/19* (2010.01)

(52) U.S. Cl.
CPC .............. *H04N 7/185* (2013.01); *G01S 19/19* (2013.01)

(58) Field of Classification Search
CPC ...................................... G01S 19/19
USPC .......................................... 348/144
See application file for complete search history.

(56) References Cited

U.S. PATENT DOCUMENTS

| 2010/0201829 A1* | 8/2010 | Skoskiewicz | G08G 1/04 348/211.2 |
| 2011/0234819 A1* | 9/2011 | Gabriel | H04N 1/00137 348/207.1 |
| 2012/0007982 A1* | 1/2012 | Giuffrida | G01C 11/02 348/144 |

\* cited by examiner

*Primary Examiner* — Andy Rao
*Assistant Examiner* — Tyler Edwards
(74) *Attorney, Agent, or Firm* — Michael A. Guth

(57) ABSTRACT

A system for tracking and video surveillance using an aerial videographic platform. The system may be adapted to follow a user possessing a GPS device with a transmitter, such as an advanced cellular telephone. The aerial platform may be commanded by the user to follow the user during a course of time, such as during the completion of an outdoor activity. The aerial platform may use a video camera to record the user while the user is engaged in the activity.

16 Claims, 3 Drawing Sheets

TRACKING OF DYNAMIC OBJECT OF INTEREST AND ACTIVE STABILIZATION OF AN AUTONOMOUS AIRBORNE PLATFORM MOUNTED CAMERA

CROSS-REFERENCE TO RELATED APPLICATIONS

This application claims priority to U.S. Provisional Patent Application No. 61/476,767 to Bevirt, filed Apr. 19, 2011, which is hereby incorporated by reference in its entirety.

FIELD OF THE INVENTION

This invention relates to aerial vehicles, namely a system with an aerial platform adapted for tracking and video recording a moving target. The platform may be radio controlled and may be actively stabilized by on-board controllers in various modes of operation.

SUMMARY

A system for tracking, video imaging, and photographing a dynamic object using an autonomous aerial videographic platform. The system may be adapted to follow a user possessing a GPS device with a transmitter, such as an advanced cellular telephone. The aerial platform may be commanded by the user to follow an object of interest, which may the user, during a course of time, such as during the completion of an outdoor activity, either from a given position, or on a prescribed trajectory pattern, relative to the user. The aerial platform may use a video camera to record the user while the user is engaged in the activity.

DETAILED DESCRIPTION

In some embodiments of the present invention, the system is comprised of a handheld control device with a graphical user interface for sending high level mission commands and information about its position, an autonomous aerial platform with vertical take-off and landing (VTOL) capability and an actuated gimbal mounted camera. Both the handheld control device, which could be implemented on an advanced cellular telephone, and the airborne vehicle are equipped with GPS and inertial navigation sensors. Estimation and control algorithms running onboard the vehicle use the measurements taken from the sensors onboard both the vehicle and the handheld device for flight and camera stabilization, as well as for ongoing correction of the relative position/trajectory of the vehicle and camera assembly with respect to the OoI. Computer vision algorithms are implemented onboard the vehicle to enhance the detection and tracking of the OoI, and the software- and hardware-based image stabilization.

Figure 1:
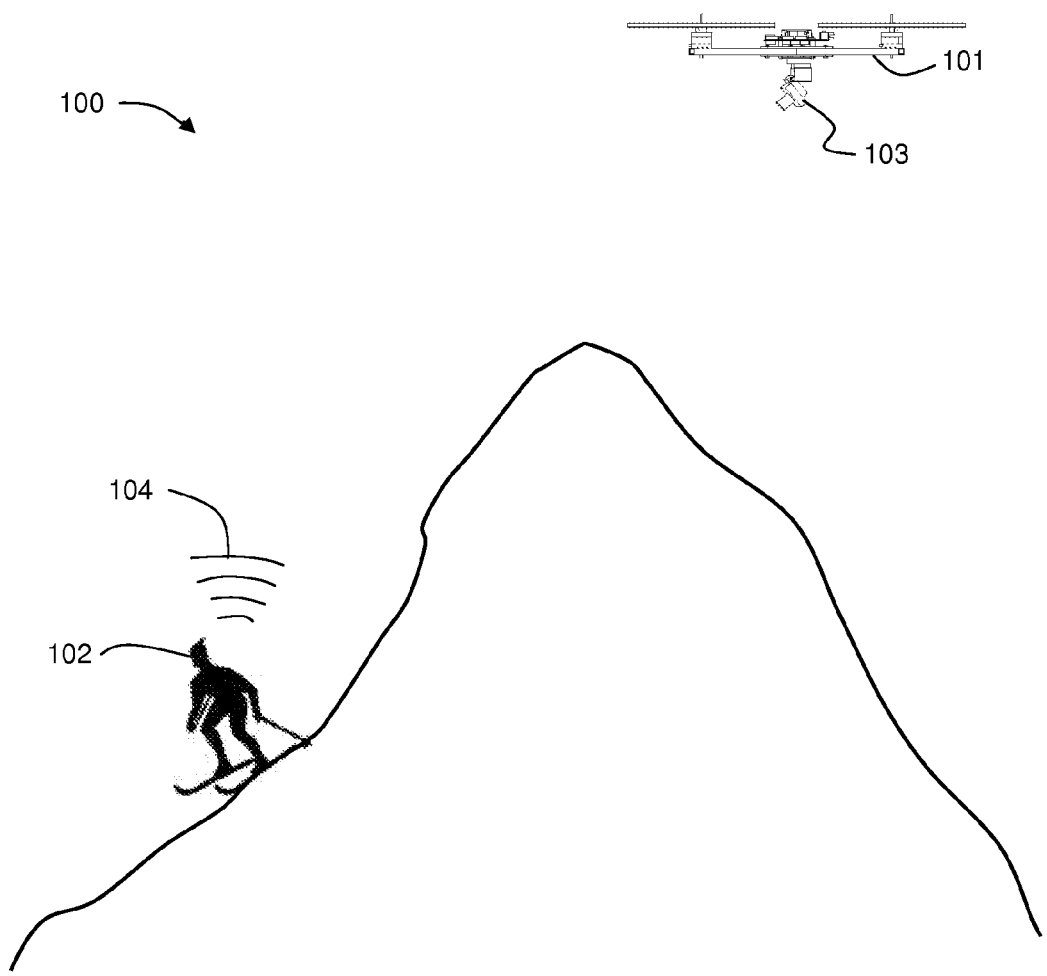
FIG. 1 is a sketch of an aerial platform tracking a user according to some embodiments of the present invention.
Figure 2:
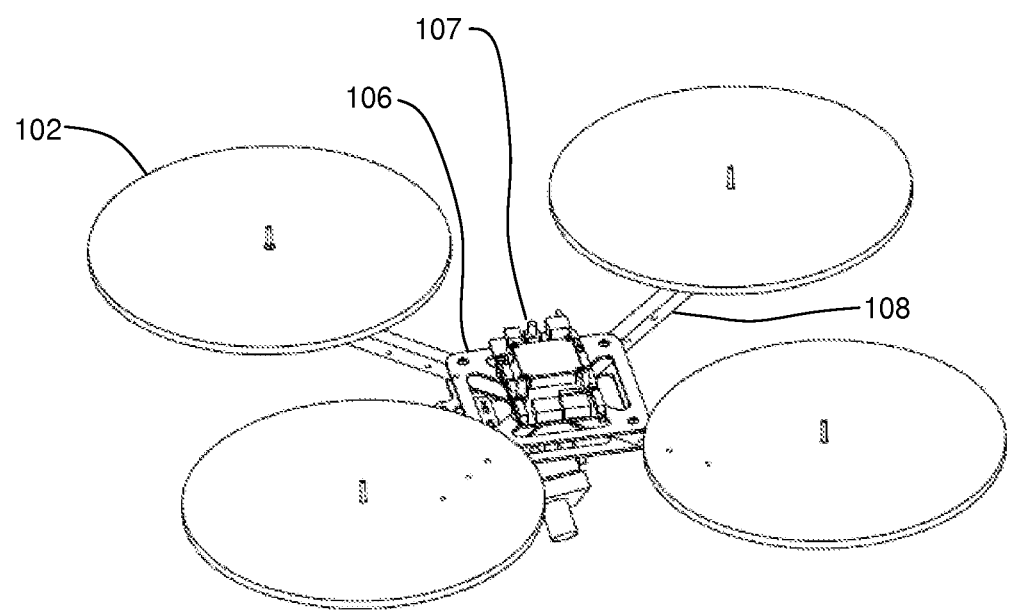
FIG. 2 is a perspective view of an aerial platform in a quad rotor configuration according to some embodiments of the present invention.
Figure 3:
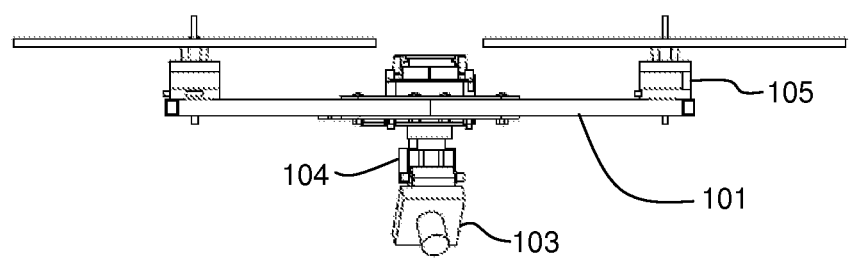
FIG. 3 is a front view of an aerial platform in a quad rotor configuration according to some embodiments of the present invention.
Figure 4:
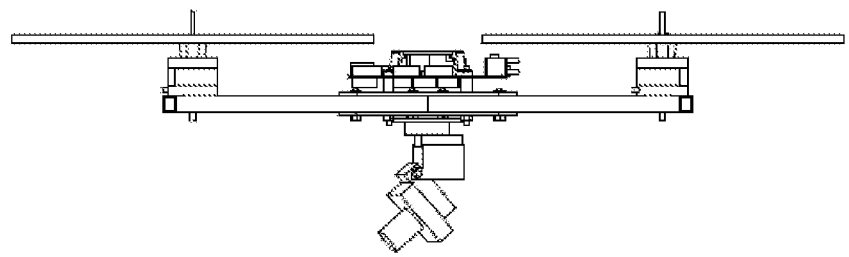
FIG. 4 is a top view of an aerial platform in a quad rotor configuration according to some embodiments of the present invention.
Figure 5:
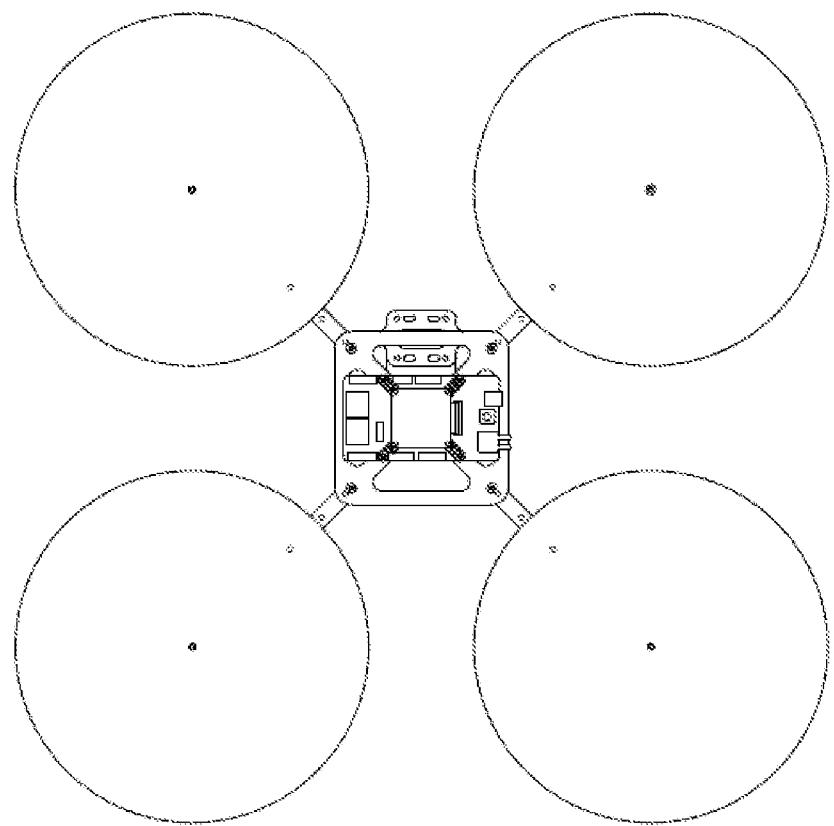
FIG. 5 is a side view of an aerial platform in a quad rotor configuration according to some embodiments of the present invention.

In some embodiments of the present invention, as seen in FIG. 1, a tracking and surveillance system 100 utilizes an aerial platform 101. The aerial platform 101 may have a video camera adapted to record video of an Object of Interest (OoI), which may be the user 102. The user 102 may have an electronic device, such as a cellular telephone with GPS capability, which emits a signal 104. The aerial platform 101 may have a video camera 103 adapted to take video and/or still images.

In some embodiments, as seen in FIGS. 2-5, the aerial platform 101 may have a main body 106 which has support arms 108. The support arms 108 may support motors 105 which drive rotors 102. The camera 103 may be attached to the main body 106 with a positioning mechanism 104. The aerial platform may be adapted to engage in horizontal flight using the four rotors as seen. The platform may be tipped in order to provide thrust with a horizontal component. Control electronics 107 may be mounted on the main body 106.

In some embodiments, the aerial platform may consist of a platform without a wing wherein the thrust is typically predominantly downward, with the use of three, four, or more spaced rotors. The platform may be adapted to hover and engage in flight along a horizontal plane.

In some embodiments, the platform supports a video camera. In some embodiments, the video camera is supported with an articulated system adapted to allow for position control of the camera. Thus, when tracking a moving object on the ground, the flight path of the platform and the view angle of the camera may be independent, or quasi-independent. In some embodiments, when coupled with an inertial measurement system and an estimation system, the articulated system may be actively controlled to isolate the camera from vehicle jitters.

In some embodiments, the system is adapted to allow the user to use an electronic device, which may be a handheld electronic controller, or a cellular telephone, to set up the operation of the aerial platform and the video camera mounted thereon. The handheld controller may be adapted to receive a signal from the camera such that the user may observe the image that is captured by the camera. In some embodiments, the video camera may transmit relatively low quality images to the handheld unit, and may record relatively high quality video stream.

In some embodiments, the system is adapted to allow the user to select from a variety of operational modes. Multiple operational modes may be strung together, with user specified parameters, to pre-plan a scene recording mission for the vehicle (e.g. take-off location, relative distance from user, segments of trajectory to follow, still photography frequency and/or trigger times, landing location, etc.). Instances of user selected and specified video recording sequences are for the aerial vehicle to record from a prescribed position, or on a given trajectory pattern, either relative to the OoI location, or relative to a fixed reference location. For example, the user may desire to have the aerial platform record video images of the user at an altitude of 15 m higher than the altitude of the user, from a position 30 m north of the user. The relative position may also be specified with respect to the OoI current direction of travel averaged over a specified time interval. The position of the aerial platform may be relative to direction of the user, such that the platform maintains a position of 30 m behind the user along the user's direction of travel, or 30 m to the left of the user on a parallel trajectory, for example. Prescribed flight trajectories may be composed by the user by selecting basic flight pattern primitives from a list (including hover, straight line, spiral, circular and polygonal patterns) and specifying their parameters. Spirals and straight lines may be in the horizontal plane, or vertical plane, or ascending or descending at a specified rate.

In some embodiment, the mission planning may be facilitated using a specially designed graphical user interface on an advanced telephone, or a dedicated handheld control device. The handheld control device may transmit tracking assistance data to the aerial vehicle. This data may include position, velocity, acceleration, orientation, and heading. This information may be fused with sensor data on the vehicle.

In some embodiments, the handheld controller and the aerial platform are both equipped with GPS capability which allows both the absolute and the relative positions of the user and the platform to be ascertained and used in positioning the platform relative to a moving user. In some embodiments, the handheld controller may be an application running on a cellular telephone, and the communication between the handheld controller and the aerial platform may be using a wireless cellular telephone network. In some embodiments, the handheld controller may communicate directly with the aerial platform.

In some embodiments, the system may be adapted to have the aerial platform hover, or follow a pre-determined flight path independent of the motion of the user, and have the camera track the user using an articulated sub-system and using image interpretation of the image generated by the camera. In some embodiments, the aerial platform may contain electronics adapted to view the user, and to track the user via articulation of the camera, based upon the taken images. In some embodiments, the aerial platform may track the user using a GPS offset, as described above, while the camera tracks the user using image interpretation. The location of the OoI within the field of view may be maintained while the aerial vehicle is in flight.

In some embodiments, the user may command the aerial platform to lift off of the ground using the handheld controller, and then may view an image taken by the camera on the aerial platform. The user may then adjust the camera parameters, such as the zoom, while reviewing the change in view of the camera. The handheld controller may also allow for selection of a variety of parameters relating to a subsequent use of the system wherein the aerial platform tracks the user and records a video of the user. The user may set the aerial platform to run for a certain length of time, and then to land in a pre-selected location. The user may set the aerial platform to run until commanded to stop and land. In some embodiments, the aerial platform may be programmed to safely land at either its current location, or at a pre-determined location, should the aerial platform or the camera lose track of the user for an extended period of time and/or when the battery charge has decreased below a certain threshold.

In some embodiments, there may be a high resolution camera used to record the images, with a field of view selected by the user, and a lower resolution wide angle camera used with a visual tracking portion of the system.

In some embodiments, the user may use the handheld device to select an Object of Interest (OoI), which may be the person possessing the GPS based phone, and a tracking capability may be used to track the selected target. In some embodiments, the tracking capability may be blended with the GPS tracking capability to augment the tracking of the OoI.

Algorithms and Principles for Tracking of Dynamic Object of Interest and Active Stabilization of an Autonomous Airborne Platform Mounted Camera Computer Vision:

In some embodiments, a combination of novel and documented computer vision algorithms are used to process images acquired with the camera to detect the OoI and determine its position and orientation with respect to the camera. These measurements are then passed to the estimation and tracking filter to improve the accuracy of the OoI position estimate.

A.1 Detection/Recognition of OoI
Featureless
Point based
General
Scale Invariant Feature Transform (SIFT): This algorithm gives the ability to extract distinctive visual keypoints that are invariant to location, scale and rotation.
Principal Component Analysis (PCA)-SIFT
Speeded Up Robust Features (SURF)
Optical flow
Hidden Markov Model (HMM)
Predefined Types
The object of interest might be selected from a predefined list of objects.
Face
Human
Bird
A.2 Object learning; The OoI may be identified by the user on different images containing the object using tools on a graphical user interface. Machine learning algorithms may be used to improve the model of the object to be tracked (predefined type or user defined) and hence improve the robustness of the algorithm.
A.3 Visual Tracking; Estimation filtering algorithm which use object position measurements resulting from the object detection algorithm(s).
B) Estimation
An estimator is an algorithm which combines the noisy measurements from the different localization sensors to determine over time the best possible estimate of an object state (e.g. position, orientation, color, texture, etc.).
B.1 Localization: A localization estimator is implemented on each the OoI localization device and the aerial platform.
Strap-down IMU
Loosely coupled GPS aided IMU
Tightly coupled GPS aided IMU
Handheld control device
Airborne vehicle
B.2 Relative position estimation; An estimator is implemented to determine the relative positions of the aerial platform and the OoI given the estimates from the respective localization estimator.
B.3 Tracking:
Extended Kalman Filter flavors (EKF, UKF, Sigma Point)
Inertial and GPS sensing only
Enhanced with computer vision
Particle Filter
Inertial and GPS sensing only
Enhanced with computer vision
Vehicle Control
A controller is an algorithm developed using feedback control theory and optimal control theory. It uses the current best estimate of an object state as an input and determines the best actuator commands to affect the state and move it to the actual target or desired state.

C.1 Multi-layer flight controller: Low-level vehicle control, mid-level trajectory following, and high-level mission control
C.2 Flight pattern primitives
C.3 Station keeping and trajectory following
C.4 Autonomous take-off and landing
C.5 Computer aided manual control
Camera Control
D.1 Camera aiming
D.2 Hardware-based image stabilization
D.3 Software-based image stabilization
User Interface
E.1 For computer aided manual control
E.2 For planning of autonomous mission. As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial tracking system for the video recording of a user tracked by a camera laden aerial platform, said system comprising:
    an aerial platform, said aerial platform comprising control electronics, said control electronics comprising control and estimation algorithms, said aerial platform capable of hovering and of horizontal flight;
    a video camera mounted on said aerial platform, said video camera coupled to said control electronics;
    a handheld ground unit controller, said handheld ground unit controller adapted to be carried by an individual user, said handheld ground unit controller in radio communication with said control electronics;
said handheld ground unit controller having a location which is a movable location moving in concert with said individual user, and wherein said aerial platform is adapted to follow a flight path which alters relative to the motion of said user who is carrying said handheld ground unit controller using estimation and control algorithms running onboard the aerial platform, and to record video images of the location of said handheld ground unit controller and said user.

2. The aerial tracking system of claim 1 wherein said handheld ground unit controller comprises a graphical user interface, and wherein said handheld ground unit controller is adapted to allow the user to plan a video recording mission from a set of user selectable flight pattern primitives.

3. The aerial tracking system of claim 2 wherein said handheld ground unit controller is adapted to allow the user to select a flight path type to track the handheld ground unit controller based upon GPS information sent by the handheld ground unit controller to the control electronics on the aerial platform.

4. A method of automated video capture of a moving subject from an aerial platform, said method comprising the steps of:
    selecting a flight profile for an aerial platform using a handheld ground unit controller, wherein said flight profile follows a flight path which tracks the motion of said handheld ground unit controller using estimation and control algorithms running within control electronics onboard said aerial platform, said handheld ground unit controller carried by a user, said aerial platform comprising a video camera;
    selecting a set of parameters for the recording of a video stream of a moving subject, wherein said moving subject comprises a user carrying said handheld ground unit controller;
    flying said aerial platform, wherein said aerial platform flies according to the selected flight profile; and
    recording video of said moving subject.

5. The method of claim 4 wherein said handheld ground unit controller is in radio communication with said aerial platform.

6. The method of claim 5 wherein said handheld ground unit controller sends GPS locations of the handheld ground unit controller to said aerial platform.

7. The method of claim 6 further comprising the step of positioning the video camera such that said video camera takes images of the moving subject.

8. The method of claim 7 further comprising the step of articulating said video camera during the flight of the aerial platform such that the video camera tracks the moving subject while said aerial platform flies in its flight profile.

9. The aerial tracking system of claim 3 wherein said aerial platform is an unmanned quadrotor vehicle.

10. The aerial tracking system of claim 3 wherein said handheld ground unit controller is a cellular telephone.

11. The aerial tracking system of claim 9 wherein said handheld ground unit controller is a cellular telephone.

12. The method of claim 5 further comprising the step of positioning the video camera such that said video camera takes images of the moving subject.

13. The method of claim 4 wherein said aerial platform is an unmanned quadrotor vehicle.

14. The method of claim 12 wherein said aerial platform is an unmanned quadrotor vehicle.

15. The method of claim 13 wherein said handheld ground unit controller is a cellular telephone.

16. The method of claim 14 wherein said handheld ground unit controller is a cellular telephone.

* * * * *